United States Patent
Fechner et al.

(10) Patent No.: US 6,300,865 B1
(45) Date of Patent: Oct. 9, 2001

(54) PROCESS FOR DETECTING THE ROAD CONDITIONS AHEAD FOR MOTOR VEHICLES

(75) Inventors: Thomas Fechner; Rainer Hach, both of Berlin (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/180,564

(22) PCT Filed: May 7, 1997

(86) PCT No.: PCT/EP97/02297

§ 371 Date: Apr. 22, 1999

§ 102(e) Date: Apr. 22, 1999

(87) PCT Pub. No.: WO97/42521

PCT Pub. Date: Nov. 13, 1997

(30) Foreign Application Priority Data

May 8, 1996 (DE) .............................................. 196 20 163

(51) Int. Cl.$^7$ ...................................................... B60Q 1/00

(52) U.S. Cl. ........................... 340/436; 340/903; 180/169; 342/70; 367/909

(58) Field of Search ..................................... 340/436, 435, 340/901, 903, 904; 180/167, 168, 169, 170; 342/70, 71, 72; 367/909

(56) References Cited

U.S. PATENT DOCUMENTS

| | | |
|---|---|---|
| 4,011,563 | 3/1977 | Robbi . |
| 4,158,841 | 6/1979 | Wüchner et al. . |
| 4,970,653 | 11/1990 | Kenue . |
| 5,343,206 | 8/1994 | Ansaldi et al. . |
| 6,125,324 | * 9/2000 | Matsuda et al. ...................... 701/208 |
| 6,141,617 | * 10/2000 | Matsuda et al. ........................ 701/72 |

FOREIGN PATENT DOCUMENTS

| | | |
|---|---|---|
| 2 215 576 | 10/1973 | (DE) . |
| 30 34 199 A1 | 4/1982 | (DE) . |
| 44 18 122 A1 | 12/1994 | (DE) . |
| 07085257 | 3/1995 | (JP) . |

* cited by examiner

*Primary Examiner*—Nina Tong
(74) *Attorney, Agent, or Firm*—McGlew and Tuttle, p.C.

(57) ABSTRACT

A process for recognizing the course of the road ahead for a motor vehicle shall be provided, in which the velocity of the vehicle is determined and the position and the velocity of objects located ahead are determined by rigid search antennas oriented in the direction of travel via a radar sensor system, and which makes possible a simple, forward-looking recognition of the course of the road by special evaluation of the measured position and velocity data available. The roadside-specific targets are filtered out of the fixed target by the threshold value comparison of the fixed target amplitudes, and the current distances between the vehicle and the side of the road are determined in discrete angle ranges by ordering filtration. The distances from the side of the road, estimated for each angle range, are sent as characteristics to a classifier for the prediction of the curve type lying ahead, and they are used as support values for a nonlinear regression to obtain a curvature parameter of the curve.

9 Claims, 7 Drawing Sheets

PROCESS FOR DETECTING THE ROAD CONDITIONS AHEAD FOR MOTOR VEHICLES

FIELD OF THE INVENTION

The present invention pertains to a process for recognizing the course of the road ahead for a motor vehicle, in which the velocity of the vehicle is determined and the position and the velocity of objects located ahead are determined by a radar sensor system with rigidly oriented antennas, fixed targets are separated in discrete angle ranges, and the distances from these fixed targets (X) are determined as current distances between the side of the road and the motor vehicle and are used as characteristics for a nonlinear regression.

BACKGROUND OF THE INVENTION

Such a process has been known from U.S. Pat. No. 5,343,206.

To increase driving safety and comfort, motor vehicles are equipped with distance control means for automatically maintaining the distance as well as with warning means for the driver. Equipping the vehicle with radar and image-processing devices for distance measurement for this purpose has been known. The position and the velocity of objects located ahead are determined from the measured values, and a safety distance is maintained by automatically controlling the velocity and by warning the driver. It is possible as a result to automatically follow a vehicle proceeding ahead in the same lane. However, it is necessary that the object relevant for the automatic distance control be always identified from the large number of objects located ahead. Besides the determination of the position of the objects detected, it is therefore also necessary to know the course of the road in order to check whether an object is located in the same lane as the vehicle. An incorrect assignment, even if it occurs only briefly, may lead to needless braking or acceleration maneuvers in the case of controlled travel, which considerably compromise the driving comfort.

As long as the lane maintains a constant direction, the direction of the vehicle may be used to determine the lane. It has been known from DE 30 34 199 A1 that the current steering angle of the vehicle can be evaluated to recognize curves. The drawback of this method is that curves cannot be indicated in advance, because the steering angle must first exceed a certain threshold value, but this happens only when the vehicle is already in a curve. In the case of changes in the direction of the lane, e.g., while entering and leaving a curve, a forward-looking recognition of the road is needed. The measure of detecting curves, which is described in U.S. Pat. No. 4,158,841, uses pivotable search antennas controlled by the steering angle. However, this solution can be embodied in a mechanically complicated manner only and it is correspondingly expensive. According to DE 44 18 122 A1, an image-processing device is used for the forward-looking recognition of the curve in addition to the radar sensor system. A process based on image processing, which is characterized by its ability to distinguish obstacles located on the collision course from other objects not located in the own lane, is likewise described in DE-OS 22 15 576. The movement of image structures, which occurs relative to the vehicle, is evaluated for this purpose. Objects not located on the collision course are distinguished from collision objects by their lateral movement, and the image structure of collision objects, without lateral movement, makes it possible to recognize the course of the road. However, the problem of the entry into curves has not been solved with this device, because the lateral movement necessary for the recognition begins only when the movement increases symmetrically. With this device, the sides of the road and thus the vehicle may already be in the curve with this device. The general drawback of image-processing systems (both optical and thermo-optical) compared with radar systems is the increased complexity of the sensor system because of the extreme dynamics of lighting occurring in nature, the short depth of penetration in fog, and the risk of contamination by road dirt.

The above-mentioned U.S. Pat. No. 5,343,206 describes a process for avoiding a collision between a vehicle and obstacles located in the lane. The estimation of the course of the road of the vehicle is performed as follows: The environment located ahead is scanned sector by sector at an angle of 40° by means of radar and all reflected targets are entered in a storage matrix called a map corresponding to the distance measured and the scanning angle. An attempt is made in the next step to determine the optimal parameters of the course of the road by adapting a mathematical model of the course of the road to all the targets entered on the map. This process fails in practice, because it contains the preparation of a map with very high resolution in terms of angle and distance, which cannot be accomplished with a rigid radar sensor system because of the limited angle resolution. Another weak point of this process is the assumption that the side of the road can always be recognized from reflecting objects. Conversely, no check is made to determine whether a detected target belongs to the side of the road. Targets which do not belong to the side of the road lead to unacceptable errors in the estimation of the parameters for the course of the road due to the fact that the targets used to estimate the course of the road are not checked to determine whether they belong to the side of the road.

SUMMARY AND OBJECTS OF THE INVENTION

The basic object of the present invention is to design the process described in the introduction such that a forward-looking recognition of the course of the road becomes possible by a special evaluation of the existing measured position and velocity data with the exclusive use of a radar sensor system with rigidly oriented search antennas without an additional optical sensor system. It shall be possible to use information on the direction of the vehicle for the correction.

According to the invention, a process is provided for recognizing the course of the road ahead for a motor vehicle. The velocity of this vehicle is determined and the position and velocity of objects located ahead of the vehicle in question are determined by a radar sensor system with rigidly oriented antennas. Fixed targets are separated in discrete angle ranges, and the distances from these fixed targets are determined as current distances between the side of the road and the motor vehicle and are used as characteristics for a nonlinear regression. The targets specific of the side of the road are determined from among the fixed targets in the discrete angle ranges by a threshold value comparison of the target amplitudes. An ordering filter, which filters the target with the shortest distance out of the roadside-specific targets determined in the angle range of a plurality of consecutive measurement cycles, is used to determine the distance between the side of the road and the motor vehicle in a discrete angle range. The targets determined in the discrete angle ranges are used as characteristics for the adaptive prediction of the curve type with a curve classifier.

A model-based Kalman filter, whose model is based on the a priori knowledge of the dynamics of the courses of roads, may be used to smooth the distances between the side of the road and the motor vehicle. A correction signal, which is obtained by the comparison of the current curve type of the vehicle with the curve type, which is predicted by the curve classifier and is time-delayed corresponding to the current velocity of the motor vehicle, may be sent continuously to the curve classifier. The curve classifier may be formed by a neuronal network. The weights of the neuronal network may be preset once by an off-line adaptation based on example situations. The weights of the neuronal network, predetermined on the basis of example situations before putting into operation, may be corrected by the correction signal during the operation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
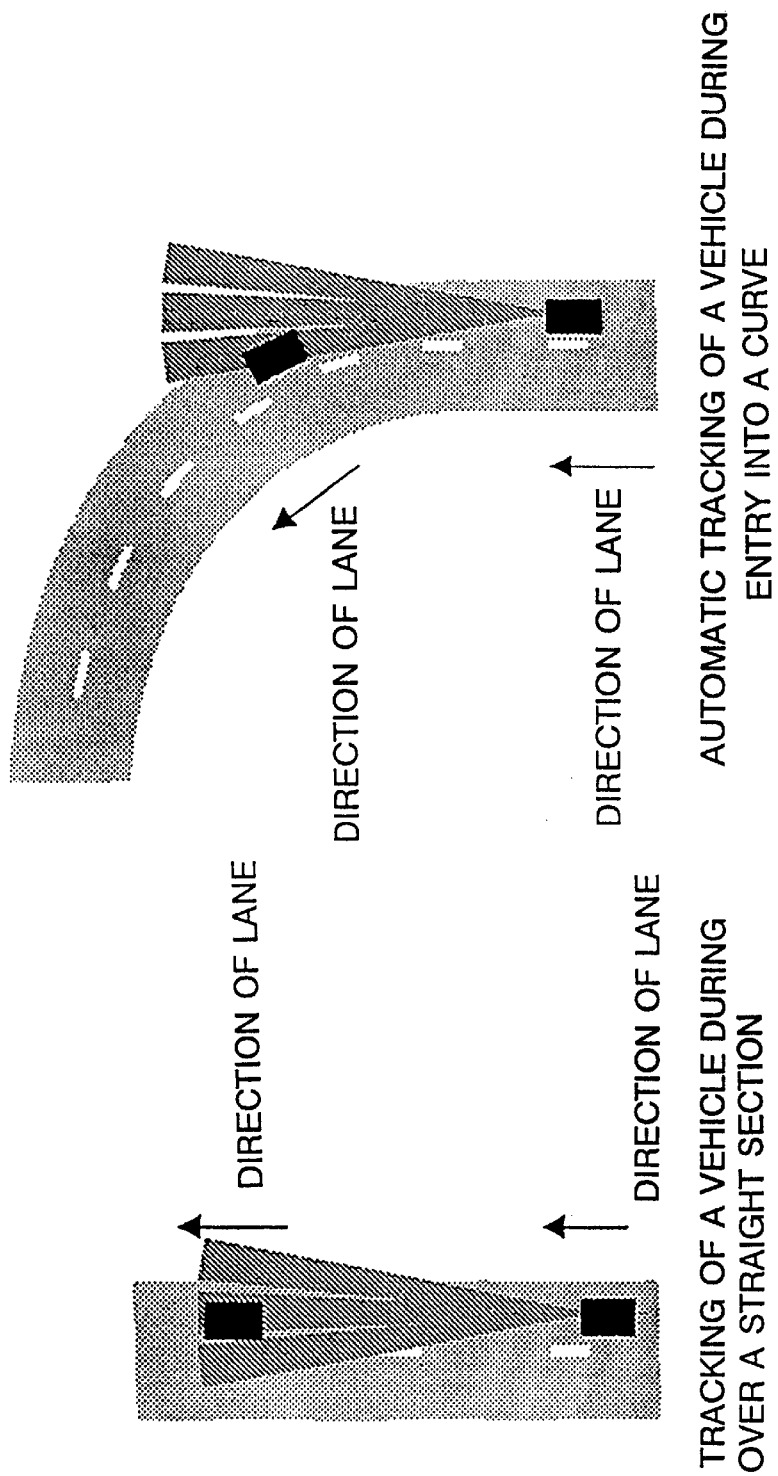
FIG. 1A is a diagram showing a typical target-tracking situations (straight section)
FIG. 1B a typical target-tracking situations (entry into a curve)
Figure 2:
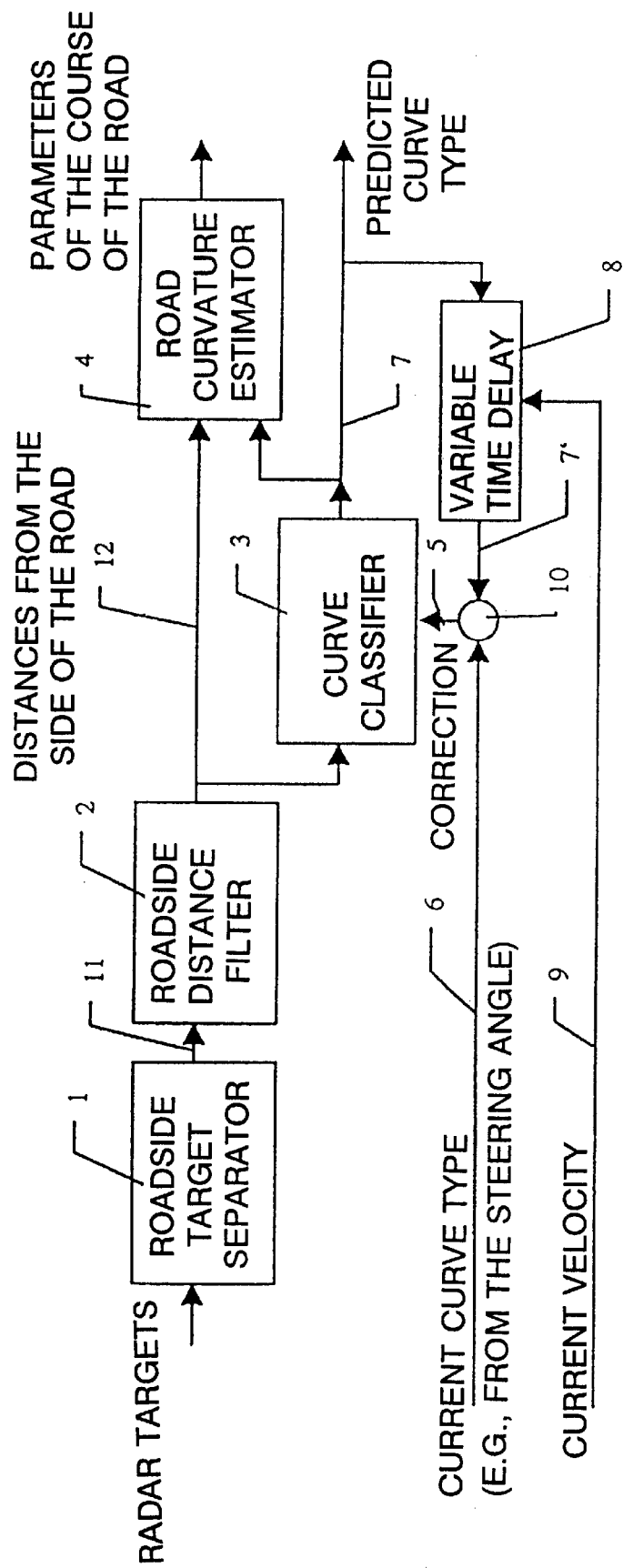
FIG. 2 is a schematic block diagram illustrating the process steps for the prediction of the course of the road.

Referring to the drawings in particular, FIG. 2 shows the block diagram of the process for predicting the course of the road, on which the present invention is based. Using a special roadside distance filter 2, the current distances 12 between the vehicle and the observed roadside are estimated from radar fixed targets from the roadside 11, which targets are separated by means of a roadside target separator 1, and they are sent to a road curvature predictor 4 as well as to a predicted curve classifier 3. With a sensor system for determining the current direction of the vehicle present, the curve classifier can be continuously corrected by the curve class 6 currently present (e.g., straight, left curve, ...). Since the prediction of the presumable curve class depends on the current velocity 9 of the vehicle, the classification signal 7 used for the correction is sent through a delay unit 8, whose time delay is always adapted to the current velocity 9. The correction signal 5 sent to the curve classifier 3 is thus based on the comparison of the delayed predicted curve classification 7' at the output of the delay unit 8 with the current curve class 6, which comparison is performed at the comparison point 10. The predicted curve class 7' is used to select the basic model (e.g., straight section, left curve, right curve) for reconstructing the course of the road ahead from the current distances 12 from the side of the road in the road curvature predictor. The parameters (curvature, distance) needed to describe the course of the road are made available at the output of the curve estimator.

Figure 3:
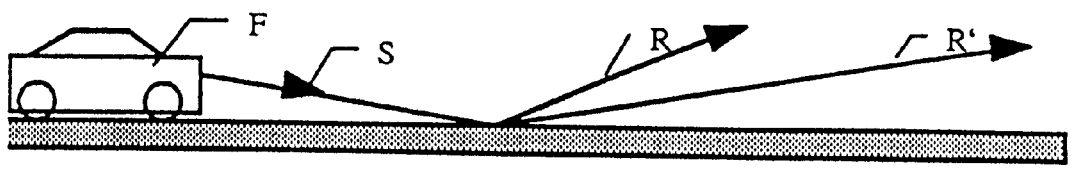
FIG. 3 is a diagram showing the reflection of a search beam on a smooth road surface.
Figure 4:
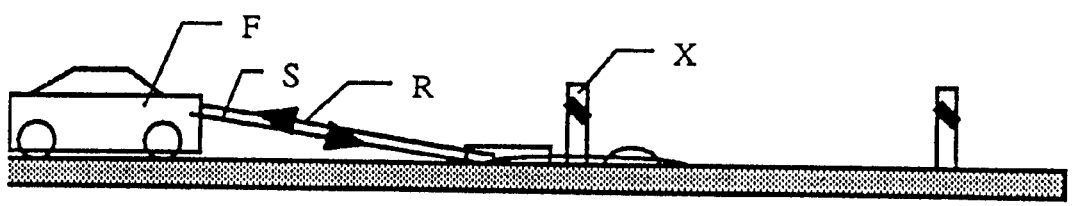
FIG. 4 is a diagram showing the reflection of a search beam on the side of the road.

The approach taken in the process being described to determine the course of the road is based on the recognition of the sides of the road. The discovery that the road usually consists of a flat, smooth surface, while the side of the road is formed by a number of fixed obstacles (e.g., guardrails, posts, vegetation, rocks, walls, etc.) and thus it represents a markedly rougher surface, is used to recognize the sides of the road. The signal amplitudes reflected from the regular road surface back to the observer are therefore usually much lower than the components reflected from the side of the road, as it can be clearly recognized from the comparison of the reflections R, R' in FIG. 2 with the reflection R of a search beam S at the side of the road as in FIG. 3.

Objects on the side of the road may occur as punctiform targets (posts, signs, etc.), which can be recognized and tracked by means of prior-art target-tracking processes (see, e.g., S. Blackmann: Multiple Target Tracking with Radar Application). However, objects on the side of the road may also occur as static surface targets with linear extension, which cannot be processed with the prior-art processes, unlike punctiform targets.

To recognize the sides of the road, the stationary targets (fixed targets) are first separated from the measured targets by comparison of the target velocities with the velocity of the vehicle. To eliminate the fixed targets undesirable for the determination of the side of the road from the road surface, a threshold value comparison of the fixed target amplitudes is performed, so that only fixed targets beyond the side of road and fixed targets of obstacles on the road will pass through this processing step. The task of the next roadside distance filter is to filter out from the potential fixed roadside targets those that are closest to the side of the road to determine the distance between the vehicle and the side of the road in the angle range observed. To dampen fluctuations, which may occur due to the variable nature of the side of the road and due to fixed objects located on the road, various measures are necessary for smoothing the measured values obtained for the distance from the side of the road.

Figure 5:
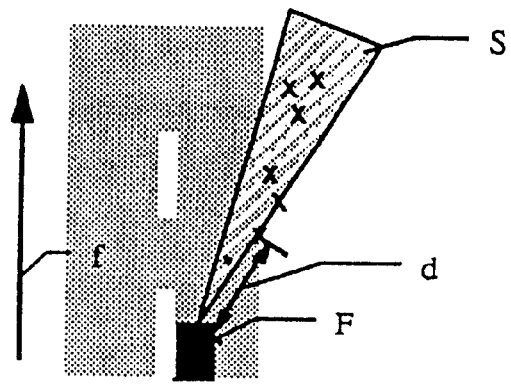
FIG. 5 is a diagram showing a fixed targets in a search beam.

According to FIG. 5, the fixed targets x of a measurement cycle, which are located on the side of the road and are found in each angle range (target beam) S, are searched for their minimal distance d from the vehicle F traveling in the direction of travel f. The fixed target with the minimal distance d is considered the initial value for the estimation of the distance from the side of the road. An ordering filter is used to dampen fluctuations that occur over several measurement cycles. The ordering filter embodies a holding function over the period of the ordering window, so that fluctuations occurring during this period toward greater distances are suppressed. Simple, linear filters are suitable for this purpose, because considerable freak values, which strongly affect the mean value, occur due to the fluctuation. In addition, the statistical distribution is strongly asymmetric around the true distance value toward higher values. For embodiment, the current measured value for the distance from the side of the road is stored in a memory, which holds the measurements of the last N cycles (N>1). The measured values present in the memory are searched for minimal distance, and the measured value with the shortest distance is output.

Figure 6:
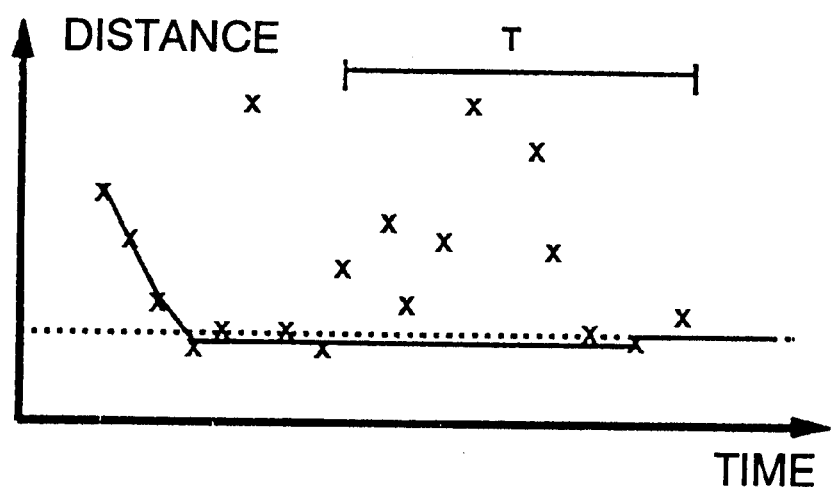
FIG. 6 is a graph showing potential distances from the side of the road after processing means of an ordering filter.

FIG. 6 shows fixed targets x with minimal distance, which are detected over time. The time window is designated by T. The solid line shows the filtered minimal distance and the broken line the true distance from the side of the road.

Figure 7:
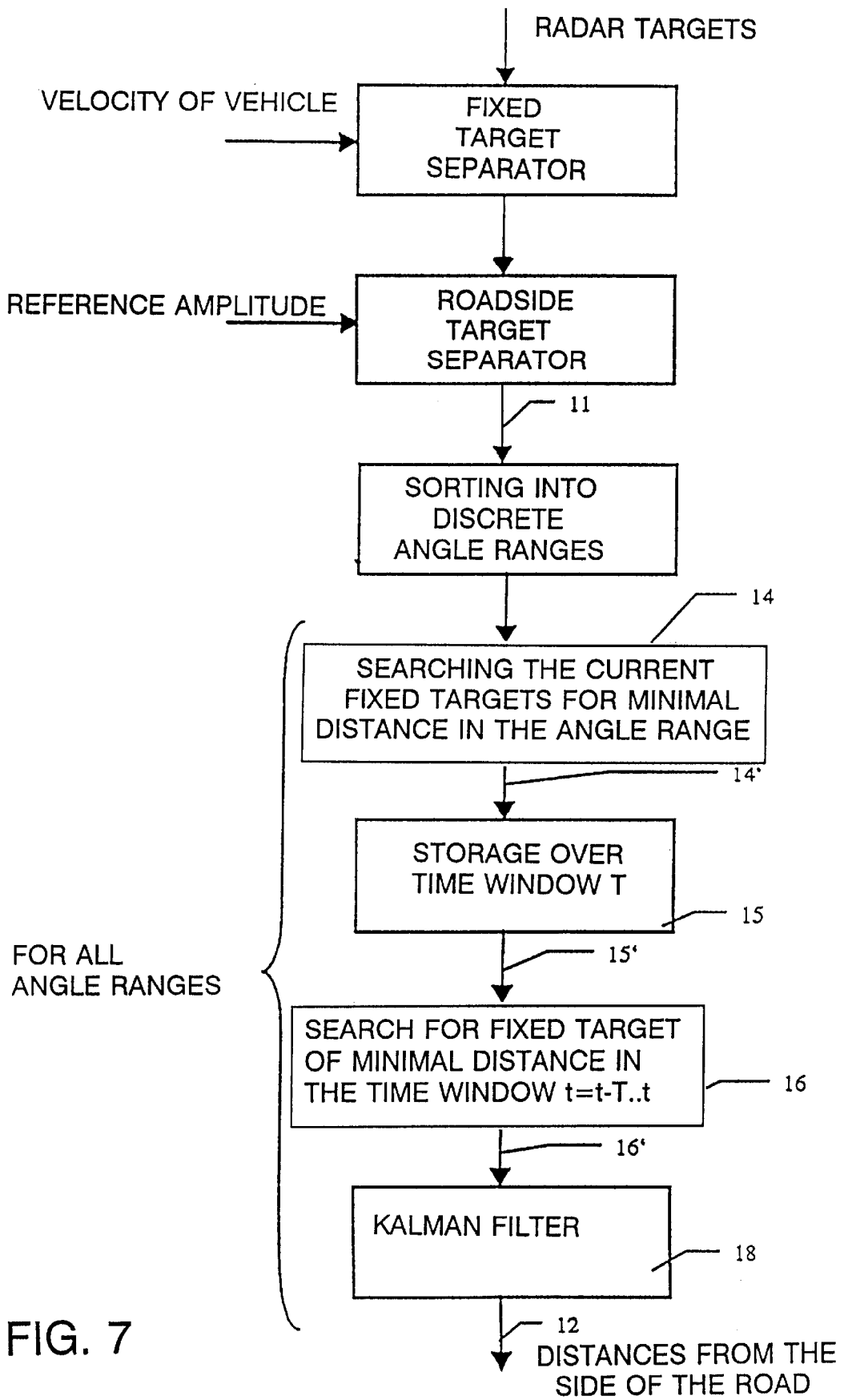
FIG. 7 is a flow chart showing an arrangement for the filtration of the side of the road.

The distances from the side of the road, which were subjected to ordering filtration as was described above, as well as the estimated variance of the measurements are then sent to a model-based Kalman filter for further smoothing. The model used is based on a priori knowledge of the dynamics of the courses of roadside and it prevents abrupt jumps in the roadside distance signal. FIG. 7 shows a general arrangement for carrying out the steps explained above. Reference number 11 designates targets on the side of the road at the time t=t0, which are sent to an ordering filter 14 for the time t=t0. The ordering filter 14 determines from them a fixed target 14'0 of the shortest distance, which will be stored in a memory 15. Fixed targets 15' from the stored time window t–T . . . t are preset for an ordering filter for this time window, and this filter sends the fixed target 16' of the shortest distance to a Kalman filter 18 for smoothing. The actual signals 12 of the distance from the side of the road, which is estimated in each angle range, are available at the output of the Kalman filter 18 for further processing. As is shown in FIG. 7, the input of the classifier 3 receives from the Kalman filter 18 blocks of chronologically consecutive roadside distances 12 from the roadside filter 2 existing for each angle range. The classifier comprises a nonlinear structure (neuronal network), which combines the input variables in one or more layers in a weighted, nonlinear manner, and finally forms an output value. The weights determine the behavior of the classifier 3 and are adapted to the desired behavior off-line or on-line.

In the case of off-line adaptation, the weights are adapted before the operation proper based on example situations. The adapted parameters are "frozen" during the operation and are not corrected any more. This mode of operation is especially advantageous for cases in which the vehicle has ultimately no travel direction transducer, so that no after-correction is possible, either.

In the case of an on-line adaptation, there is a possibility for adapting the weights during the operation if a vehicle direction sensor is present. To do so, the correction signal 5 is formed at the comparison point 10 from the current curve type 6 and the predicted curve type 7', which is adapted to the current velocity 9 of the vehicle and is time-delayed.

Figure 8:
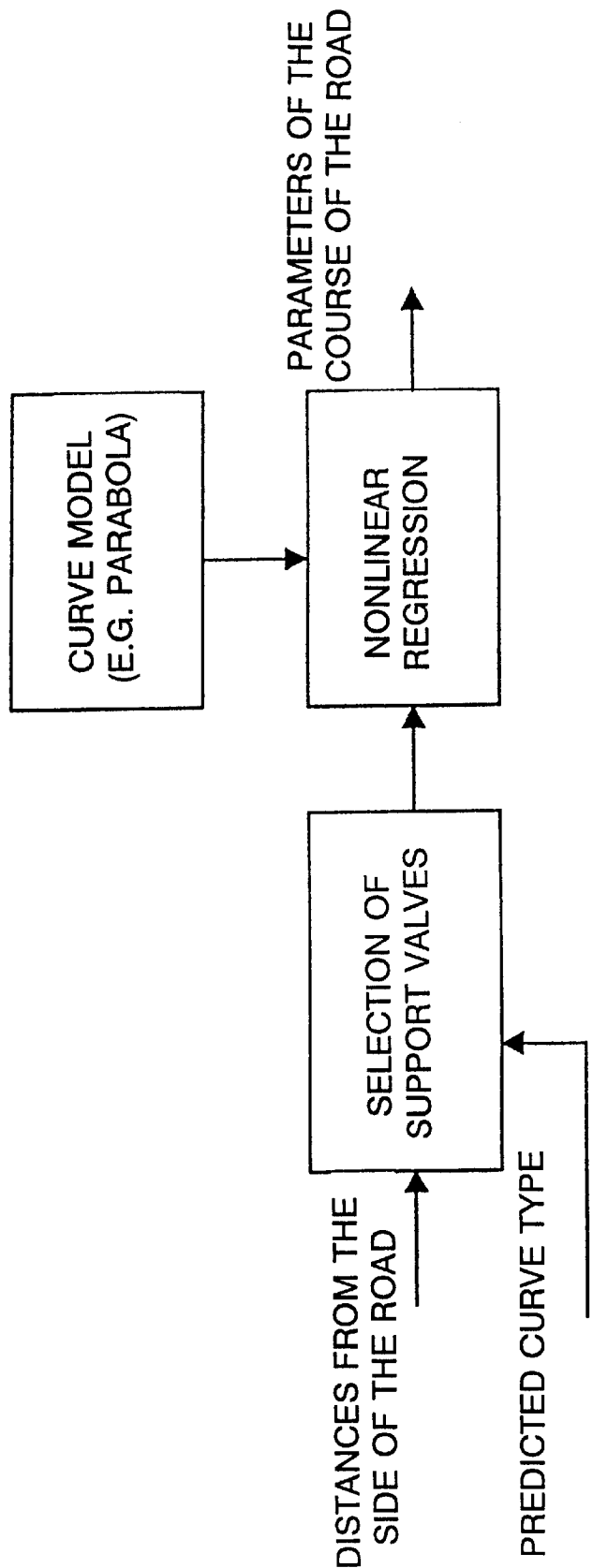
FIG. 8 is a block diagram of a road curvature estimator.

The road curvature estimator 4 represents the last evaluation step in the process according to the present invention. According to FIG. 8, the parameters for describing the course of the road ahead (curvature of the road, distance) are made available at the output on the basis of the available information (predicted curve type and current distances from the side of the road in discrete angle ranges). Depending on the predicted curve type, the course of the road is reconstructed from the current distances from the side of the road. The prediction of the curvature of the road may be performed, e.g., by means of a polynomial, which is placed optimally through the support points, which are obtained from the distances from the sides of the road, taking into account the width of the road.

To make do without assumptions on the width of the road, a regression line through the roadside distance support values may be used in order to determine a polynomial parameter such that the polynomial will have the same slope as the regression line at the distance that corresponds to the mean distance of the roadside distance support values. This process is called "slope adaptation" here.

Figure 9:
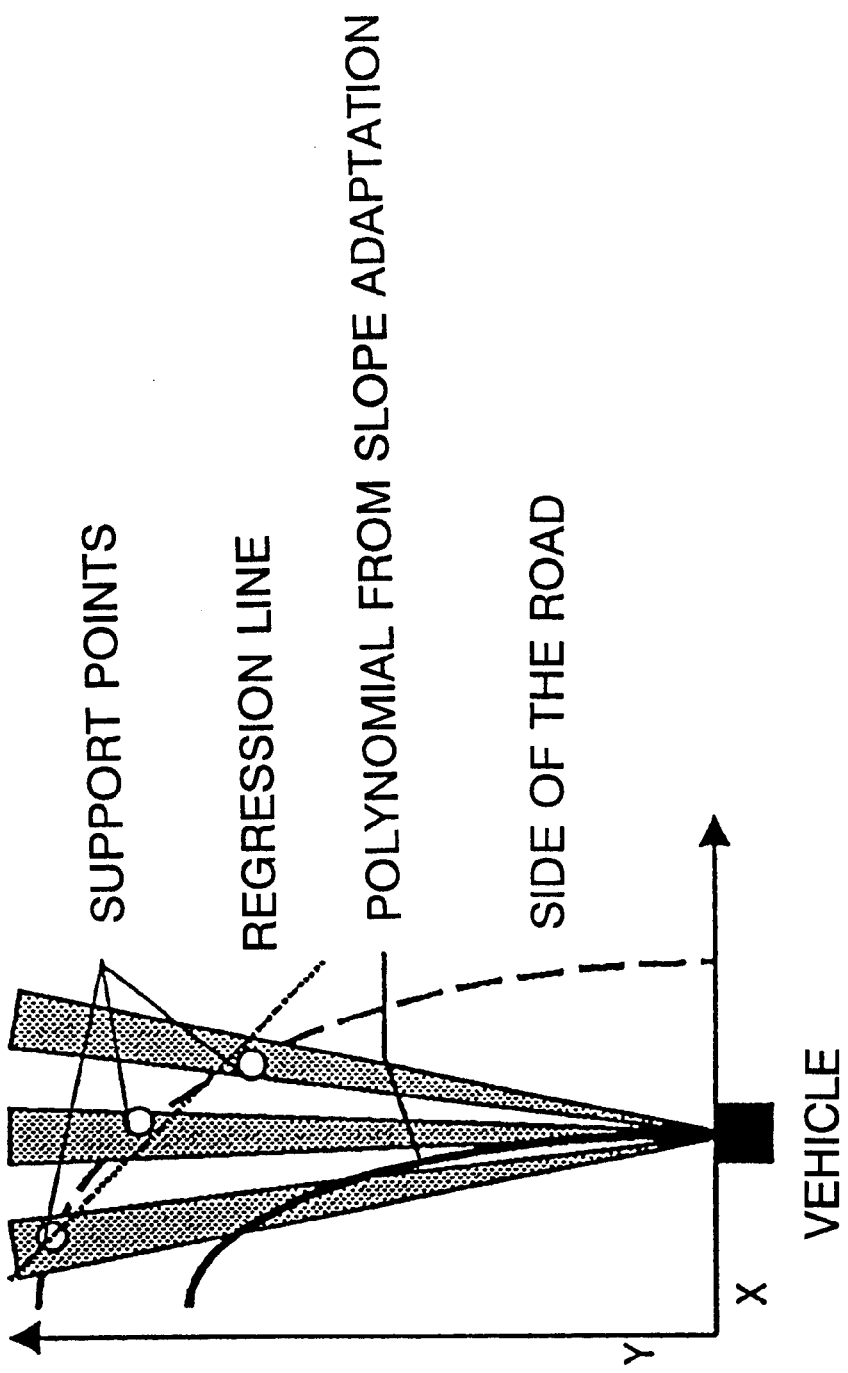
FIG. 9 is a diagram showing an example of a linear regression with 3 support values.

FIG. 9 shows as an example how a regression line is drawn through three roadside distance support values and the course of a polynomial obtained by means of slope adaptation.

Figure 10:
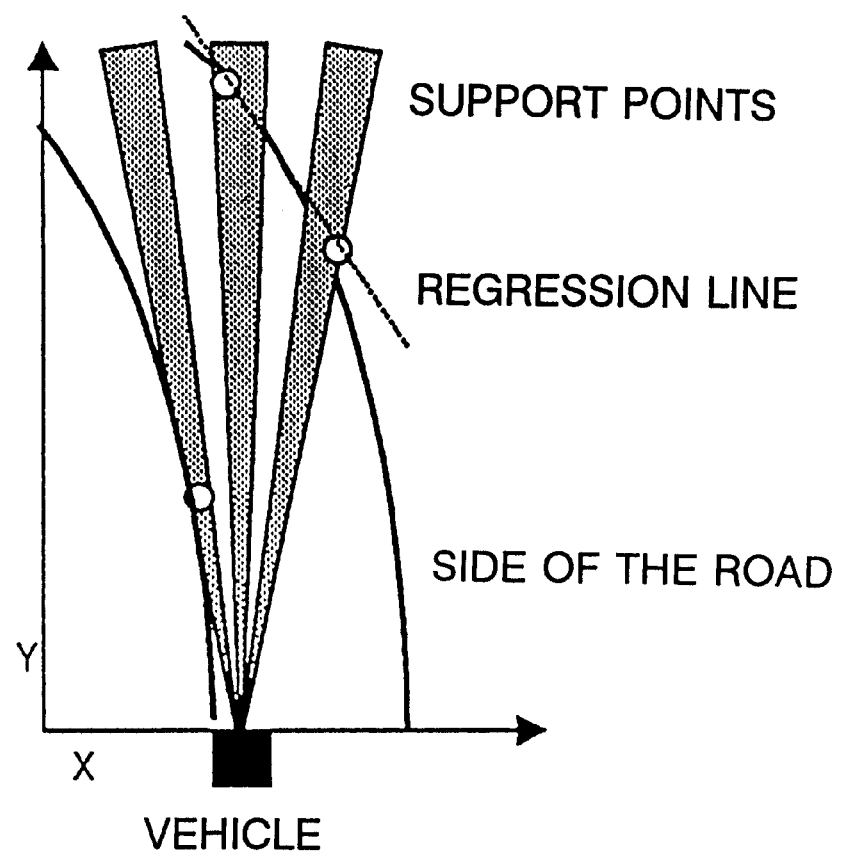
FIG. 10 is a diagram showing an example of a linear regression with a selection of 2 out of 3 support values, which selection is controlled by the curve classifier.

FIG. 10 shows how the information on the curve type (here left curve), which is obtained from the curve classifier, is advantageously used for the linear regression in the selection of the support values. The support value originating from the left side of the road violates the monotony condition for the support values of a left curve and is therefore not subjected to further processing.

The exceptional case that an object is located on the road and thus represents an obstacle, yields a measured value to which the above assumption does not apply. However, since a large number of measured values are used in the process described below in order to predict the course of the road, the process is robust compared with individual measured values, which originate from obstacles on the road.

While specific embodiments of the invention have been shown and described in detail to illustrate the application of the principles of the invention, it will be understood that the invention may be embodied otherwise without departing from such principles.

What is claimed is:

1. A process for recognizing the course of the road ahead for a motor vehicle, the process comprising the steps of;

determining the velocity of the motor vehicle;

determining the position and velocity of objects located ahead of the vehicle by a radar sensor system with rigidly oriented antennas;

separating fixed objects out of the objects located ahead of the vehicle, said separating being performed in a plurality of discrete angle ranges;

determining current distances between a side of the road and the motor vehicle from the fixed objects and using the determined current distances as characteristics for a nonlinear regression;

determining the objects which are specific of the side of the road from among the fixed objects in the discrete angle ranges by a threshold value comparison of radar target amplitudes;

filtering, with an ordering filter, the object with a shortest distance out of the roadside-specific objects determined in each of the discrete angle ranges over a plurality of consecutive measurement cycles;

using the filtered object from said ordering filter to determine the distance between the side of the road and the motor vehicle in each of the discrete angle range; and using the objects determined in the discrete angle ranges as characteristics for an adaptive prediction of a curve type using a curve classifier.

2. The process in accordance with claim 1, wherein a model-based Kalman filter, whose model is based on a priori knowledge of dynamics of courses of roads, is used to smoothen said distances between the side of the road and the motor vehicle.

3. The process in accordance with claim 2, wherein a correction signal, which is obtained by comparison of a current curve type of the motor vehicle with a curve type which is predicted by the curve classifier and is time-delayed corresponding to the current velocity of the motor vehicle is sent continuously to the curve classifier.

4. The process in accordance with claim 2, wherein the curve classifier is formed by a neuronal network.

5. The process in accordance with claim 1, wherein a correction signal, which is obtained by comparison of a current curve type of the motor vehicle with a curve type which is predicted by the curve classifier and is time-delayed corresponding to the current velocity of the motor vehicle is sent continuously to the curve classifier.

6. The process in accordance with claim 5, wherein the curve classifier is formed by a neuronal network.

7. The process in accordance with claim 1, wherein the curve classifier is formed by a neuronal network.

8. The process in accordance with claim 7, wherein weights of the neuronal network are preset once by an off-line adaptation based on example situations.

9. The process in accordance with claim 7, wherein the weights of the neuronal network, predetermined on a basis of example situations before being put into operation, are corrected by the correction signal during operation.

* * * * *